United States Patent [19]

Nishimura et al.

[11] Patent Number: 5,027,209

[45] Date of Patent: Jun. 25, 1991

[54] INTERPOLATION CIRCUIT FOR DIGITAL SIGNAL PROCESSOR

[75] Inventors: Keizo Nishimura, Yokosuka; Shigemitsu Higuchi, Fujisawa; Fuzio Okamura, Yokohama, all of Japan

[73] Assignee: Hitachi, Ltd., Tokyo, Japan

[21] Appl. No.: 323,780

[22] Filed: Mar. 15, 1989

[30] Foreign Application Priority Data

Mar. 17, 1988 [JP] Japan .................................. 63-61935

[51] Int. Cl.$^5$ .............................................. H04N 5/14
[52] U.S. Cl. ................................... 358/160; 358/163; 358/167; 358/314; 358/336
[58] Field of Search ............... 358/160, 162, 163, 166, 358/167, 336, 314, 36, 37, 21 R; 382/52, 54; 360/38.1; 371/37.2, 37.7, 41; 364/723

[56] References Cited

U.S. PATENT DOCUMENTS

| | | | |
|---|---|---|---|
| 4,064,531 | 12/1977 | Koubek | 358/166 |
| 4,368,483 | 1/1983 | Liu | 358/36 |
| 4,464,686 | 8/1984 | Reitmeier | 358/36 |
| 4,470,065 | 9/1984 | Reitmeier | 358/336 |
| 4,498,104 | 2/1985 | Schulz | 358/160 |
| 4,517,600 | 5/1985 | Reitmeier | 358/166 |
| 4,573,070 | 2/1986 | Cooper | 358/166 |
| 4,605,966 | 8/1986 | Collins | 358/167 |
| 4,656,514 | 4/1987 | Wilkinson et al. | 358/160 |
| 4,675,735 | 6/1987 | Wilkinson et al. | 358/160 |
| 4,789,893 | 12/1988 | Weston | 358/166 |
| 4,862,271 | 8/1989 | Smith et al. | 358/160 |

FOREIGN PATENT DOCUMENTS 56-149190  11/1981  Japan .

OTHER PUBLICATIONS

Radio Gijutsusha, "Digital Audio"; Doi et al; pp. 209-210.

Primary Examiner—John W. Shepperd
Assistant Examiner—Michael D. Parker
Attorney, Agent, or Firm—Antonelli, Terry, Stout & Kraus

[57]  ABSTRACT

An interpolation circuit, in which a digital signal produced by sampling and quantizing an analog information sequentially is encoded so that, in case a certain one of the encoded sample data is erroneous, a correct data in place of the erroneous sample data is prepared as an interpolation data by interpolating other correct sample data. The interpolation circuit includes: a first extrapolation circuit for generating a first extrapolation data by extrapolating two sample data preceding the erroneous sample data to the position of said erroneous sample data, a second extrapolation circuit for generating a second extrapolation data by extrapolating the two sample data succeeding the erroneous sample data to the position of the erroneous sample data, and an averaging circuit for generating the interpolation data by arithmetically averaging the first and second extrapolation data.

6 Claims, 13 Drawing Sheets

INTERPOLATION CIRCUIT FOR DIGITAL SIGNAL PROCESSOR

BACKGROUND OF THE INVENTION

The present invention relates to an interpolation circuit for producing and outputting correct data in place of an error sample data, which exists in an encoded digital signal obtained by sampling and quantizing an analog information sequentially, as a concealed data by the concealing operation of other correct sample data and, more particularly, to an interpolation circuit suitable for digital processing of video signals as in a digital VTR.

In a case where analog information signals are audio signals, the known error concealing circuit for the encoded data of the prior art is exemplified by a prevalue holding circuit for holding the sample data immediately before the error data and substituting it for the error data or an averaging interpolation circuit for averaging the sample data before and after the error data and using the averaged data as the concealed data in place of the error data, as disclosed in "Digital/Audio" (edited by Doi and Iga and published by Radio Gijutsusha), pp. 209 and 210.

In the interpolation circuit using the pre-value holding circuit or averaging interpolation circuit to be applied to the digital audio signals, no consideration is given to the interpolation accuracy when the correlation between the adjacent sample data is loose, as in the case of a composite video signal where a color signal component is superposed on a luminance signal component. If the interpolation circuit is applied to video signals having a small correlation between the adjacent sample data, the concealing error is enlarged to raise a problem that the image quality is seriously deteriorated in the case where the video signals are displayed in the monitor.

In the case where the analog information signals are the video signals, on the other hand, there is known an error correction (dropout compensation) circuit for substituting the error data with the data, which is extracted from the signal in a horizontal scanning period preceding the horizontal scanning period containing the error data by one, as disclosed in Japanese Patent Laid-Open No. 56-149190. If this error correction circuit is applied to composite video signals, the signals (or data) preceding the horizontal scanning line (or signal line), in which the error data is generated, by one and is stored in a memory. The signals are then read out and separated into luminance signal components and color signal components and are then delayed by respectively suitable time periods of one line. The color signal components are adjusted to the phase corresponding to the color burst phase of the signal line, on which the error data is generated, and are then composed so that they are substituted for the signal line containing the error data.

According to this technique, however, the delay value is added or subtracted for adjusting the color signal components in phase so that no consideration is given to the highly accurate interpolation to raise the problem of the deterioration in the image quality inevitably. Moreover, a circuit for separating the composite video signal into the luminance signal components and the color signal components is also required to raise another problem of enlarging the circuit scale.

SUMMARY OF THE INVENTION

An object of the present invention is to provide an interpolation circuit which is free from any of the above-specified defects of the prior art and which can accomplish the error data correction with a simple circuit structure while causing little image quality deterioration even if it is applied to composite video signals.

In order to achieve this object, there is provided an interpolation circuit which includes a data source for sampling and quantizing analog information sequentially to generate sample data together with an error data indicating the correctness thereof first generator means for generating data, when a certain sample data is generated, from two sample data preceding the certain sample data second generator means for generating data, when a certain sample data is generated, from two sample data succeeding the certain sample data operating means for operating the data coming from the first and second generator means and substitution means for substituting a certain sample data with the output of the operation means when an error data attendant on a certain sample data is erroneous.

In a case where an encoded sample data, for example, is obtained by sampling video signals with a frequency four times as high as that of a color subcarrier, an error correction of remarkably high accuracy can be achieved if the error sample data is concealed from the average value of first and second extrapolated data (at an operated value), which is obtained by extrapolating the values of two right/left diagonal sample data preceding and succeeding an error sample data on one line including the error sample data.

In a case where the four sample data used for this concealing operation contains an error data, they cannot be used. Thus, the concealed value may be determined by combining two sample data adjoining in the (right and left) diagonal directions, as viewed from the error sample data on the screen displaying the video signals. The concealed value can also be determined by combining the two sample data which are taken every two sample data, for example, in each direction. Moreover, the concealed value to be used can be that determined by combining those various two sample data.

The positions of these four concealing sample data are fixed. If these sample data contains an error, the operation is switched to another concealing operation circuit such as a conventional averaging interpolation. It is also effective for preventing the image quality deterioration to prioritize the aforementioned various combinations to select them suitably.

DESCRIPTION OF THE PREFERRED EMBODIMENTS

Figure 1:
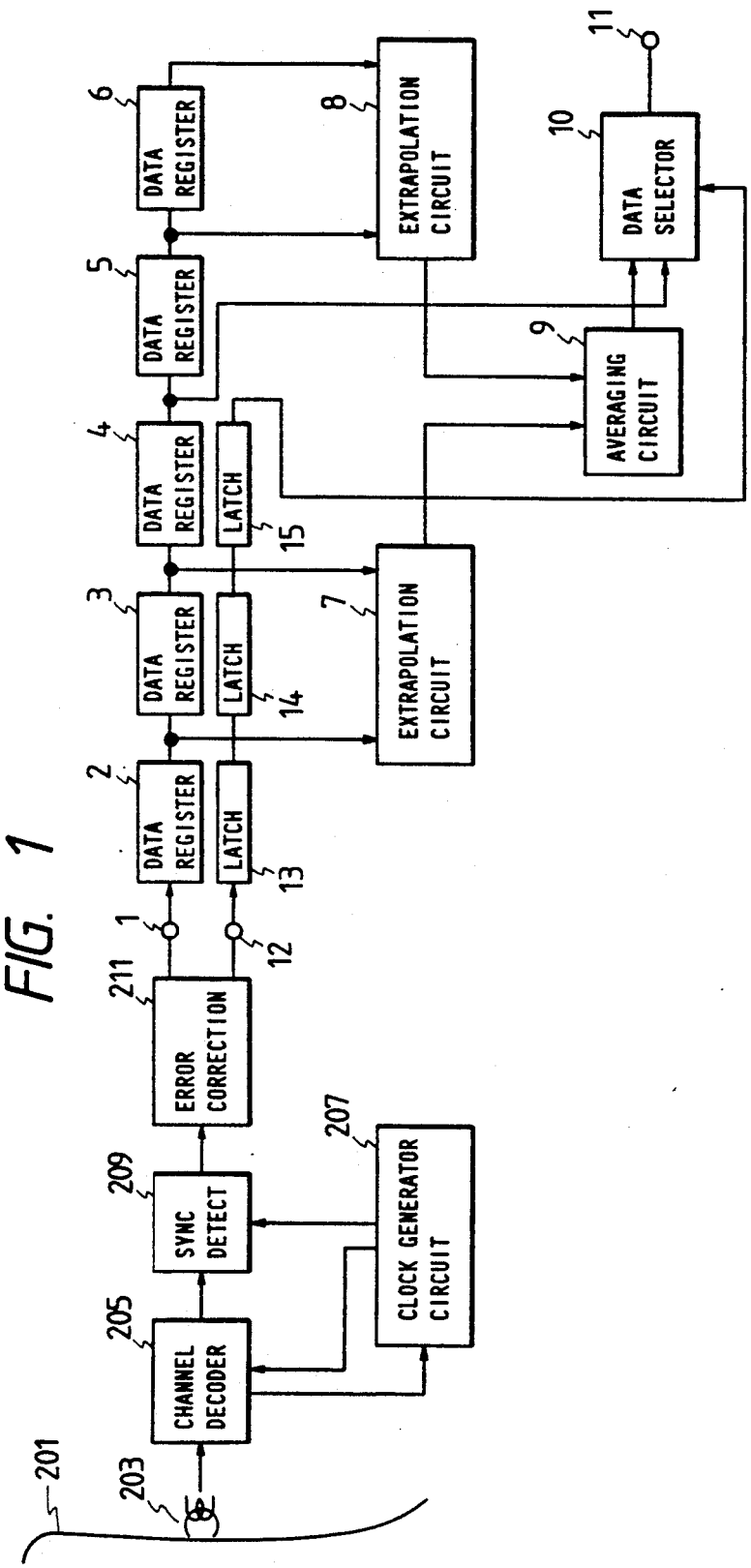
FIG. 1 is a block diagram showing one embodiment of the present invention.

First of all, the principle of the present invention will be described in the following.

A composite video signal is prepared by superposing a color signal on a luminance signal, the latter of which can be concealed relatively accurately even by the pre-value holding or averaging interpolation of the prior art because the adjacent sample data have a high correlation. It is apparent that the error concealing of sufficiently high accuracy can be accomplished even with the average value of two extrapolation values adjoining and next adjoining in either direction on the monitor as in the present invention.

As to the color signal components, on the other hand, the correlation is present not between the digitized adjacent sample data but in the image information itself. Hence, the color signal component may be deemed as a sinusoidal wave of constant amplitude and frequency between the preceding and succeeding several sample data. Thus, the color signal components of five consecutive sample data A, B, C, D and E sampled with a frequency four times as high as the color subcarrier are expressed by:

$$A = M \sin \phi;$$
$$B = M \sin (\phi + 90°);$$
$$C = M \sin (\phi + 180°);$$
$$D = M \sin (\phi + 270°);$$

and $$E = M \sin (\phi + 360°).$$

Hence, the following relations hold:

$$A = E;$$
$$C = -A;$$

and $$D = -B.$$

Here, if an error is caused in the sample data C, an extrapolation X obtained by extrapolations from the positions of two sample data B and A forward (or left) adjoining and next adjoining to the position of the sample data C is expressed by:

$$X = 2 \cdot B - A$$

On the other hand, an extrapolation Y obtained by extrapolations from the positions of two sample data D and E backward (or right) adjoining and next adjoining to the position of the sample data C is expressed by:

$$Y = 2 \cdot D - E.$$

The interpolation value of the average value of the extrapolation values is calculated, as follows:

$$(X + Y)/2 = B + D - (A/2 + E/2)$$
$$= -A$$
$$= C.$$

Thus, the interpolation value correctly interpolates the error sample data C. As a result, the present invention can accomplish the error concealing of high accuracy in the composite video signals.

According to the present invention, moreover, the error concealing of high accuracy can be effected with another combination of sample data or with another sampling frequency so long as the relations of the color signal components of the five sample data including the error sample data follow the above-specified equation. In the sampling case with a frequency four times as high as the color subcarrier, similar operations can also be accomplished with the four sample data adjoining in the left diagonal upward direction and in the right diagonal downward direction and with sample data adjoining in the left diagonal downward upward and in the right diagonal downward direction. These interpolations can be switched in case the sample data itself for the concealing operation contains an error. This concealing can also be accomplished with a more or less drop in the accuracy even by the four sample data taken every two sample data in the horizontal direction. Similar operations can also be effected even by another combination of the forward (or left) two sample data and the left diagonal upward two sample data.

With the use of the diagonal four sample data, moreover, the present invention can be applied to the case of sampling with the frequency two times as high as the color subcarrier. Likewise, four alternate sample data can be used by the sampling of the color sub-carrier of eight times.

FIG. 1 is a block diagram showing the structure of one embodiment of the present invention.

Figure 17:
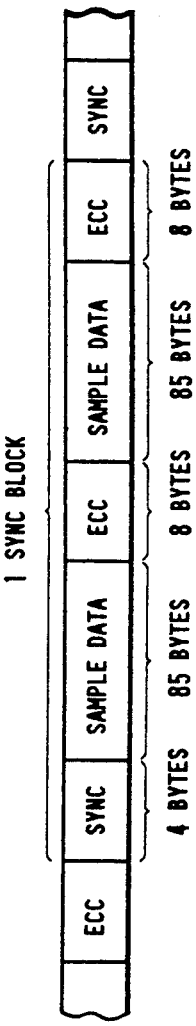
FIG. 17 is a data array diagram showing the assignment of one Sync Block.

An electric signal corresponding to a binary digital signal is written in the form of a helical track in a magnetic tape 201. One track is composed of 204 Sync blocks, as shown in FIG. 17, and one field frame is formed of 6 tracks. A magnetic head 203 reproduces electric signals from the tracks, and a channel decoder 205 reproduces binary signals from the electric signals. As a result, binary signals of $(4+85+8+85+8) \times 204 \times 8$ bits are obtained by reproducing one track. A clock generator circuit 207 generates a clock signal, which is synchronized with a reproduction signal reproduced on a bit basis, for controlling the operations of the channel decoder 205 and a Sync detector 209. This Sync detector 209 divides the binary signal, which is generated in time series, into eight bits, which are outputted altogether as one data. An error correction circuit 211 receives 85 sample data and an ECC (Error Correction Code) of 8 bytes to correct the 85 sample data on the basis of the ECC, but leaves such sample data mixed those that cannot have their errors corrected with the ECC. As a result, the error correction circuit 211 generates an error flag indicating the correctness for each sample data. The sample data of 1 byte and the error flag are simultaneously outputted to terminals 1 and 12, respectively.

The numeral 1 designates the data input terminal to be fed with the digitized and encoded video signal sample data; numerals 2 to 6 designate shift registers for storing and shifting the inputted sample data sequentially one by one; numerals 7 and 8 designate extrapolation circuits for operating to obtain extrapolated values; numeral 9 designates an averaging circuit for operating to obtain an average value; and numeral 10 a data selector for switching the input data and the interpolation data and outputting either of them. Numeral 11 designate a data output terminal for outputting the interpolated data. The numeral 12 designates the flag input terminal for receiving the error flag (i.e., the error flag indicating the error sample data which can not be concealed by the error concealing code in case the sample data is fed in the form of the error concealing code) indicating a code error, if any, for each sample data inputted from the input terminal 1. Numerals 13 to 15 designate latches for storing and shifting the inputted error flags sequentially in a manner to correspond to the individual sample data.

The present invention is also effective if applied to a system for transmitting or recording and reproducing audio signals or component video signals digitized and encoded. The description to be made is directed to the case in which the present invention is applied to a system for transmitting the NTSC composite video signals sampled with a frequency of four times as high as that of the color subcarrier. Here, the error correction circuit 211 has a function to detect and correct the code error, which is caused during transmission with the error correcting code added to the sample data, and to add the error flag to the sample data, if any, which is left uncorrected and is erroneous. Despite this fact, however, the error correction circuit 211 need not always be provided with the correcting ability, and the interpolation according to the present invention can be accomplished merely by detecting the code error with the error detection code having no correcting ability and by adding the error flag to the error sample data detected.

The video signal sample data, which are transmitted while having their code errors detected and corrected, are sequentially inputted through the input terminal 1 to the data register 2. Simultaneously with this, the error flags corresponding to the video signal sample data, respectively, are sequentially inputted through the flag input terminal 12 to the latch 13. The error flags take a value "1" indicating the error, in case the video signal sample data contain such code errors as cannot be corrected with the error correction code, and a value "0" in other cases.

The output of the data register 2 is inputted to the data register 3, the output of which is inputted to the data register 3, the output of which is inputted to the data register 4, the output of which is inputted to the data register 5, the output of which is inputted to the data register 6. When one video signal sample data is inputted to the data register 2, the data having been stored in the data register 2 till that time is transferred to the data register 3, the data of which is transferred to the data register 4, the data of which is transferred to the data register 5, the data of which is transferred to the data register 6. Likewise, the output of the latch 13 is inputted to the latch 14, the output of which is inputted to the latch 15. When the error flag is inputted to the latch 13, the error flag having been stored in the latch 13 till that time is transferred to the latch 14, and the error flag having been stored in the latch 14 is transferred to the latch 15.

Figure 5:
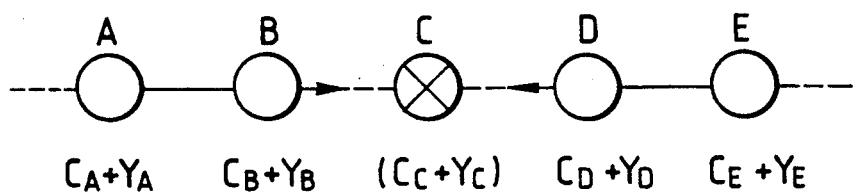
FIGS. 5 to 8 are explanatory diagrams showing the relations among sample data for explaining the operations of the embodiment of the present invention.

When the signal sample data continuing on the image line, as shown in FIG. 5, and the corresponding error flags are inputted in the order of A, B, C, D and E from the data input terminal 1 and the flag input terminal 12, the data registers 2, 3, 4, 5 and 6 store the sample data E, D, C, B and A, respectively. On the other hand, the latches 13, 14 and 15 store the error flags of the sample data E, D and C, respectively. Therefore, the output of the latch 15 takes the value "1", in case the sample data C contains an uncorrectable error, and the value "0" in the case of no error.

The output of the data register 2 is inputted to not only the data register 3 but also the next adjacent data input terminal (not shown but will be described hereinafter), and the output of the data register 3 is inputted to not only the data register 4 but also the adjacent data input terminal (not shown but will be described hereinafter) of the extrapolation circuit 7. On the other hand, the output of the data register 5 is inputted to not only the data register 6 but also the adjacent data input terminal (not shown but will be described hereinafter) of the extrapolation circuit 8, and the output of the data register 6 is inputted to the next adjacent data input terminal (not shown but will be described hereinafter) of the extrapolation circuit 8. As a result, if the contents of the data registers 2, 3, 4, 5 and 6 are the values of the sample data E, D, C, B and A of FIG. 5, respectively, the values of the sample data E, D, B and A are inputted to the adjacent data input terminal and the next adjacent data input terminal of the extrapolation circuit 7 and the adjacent data input terminal and the next adjacent input terminal of the extrapolation circuit 8, respectively. For simplicity, the values of the sample data A and B are designated as A and B, respectively. Moreover, it is assumed that the individual sample data be quantized in the straight binary form of 8 bits.

Figure 2:
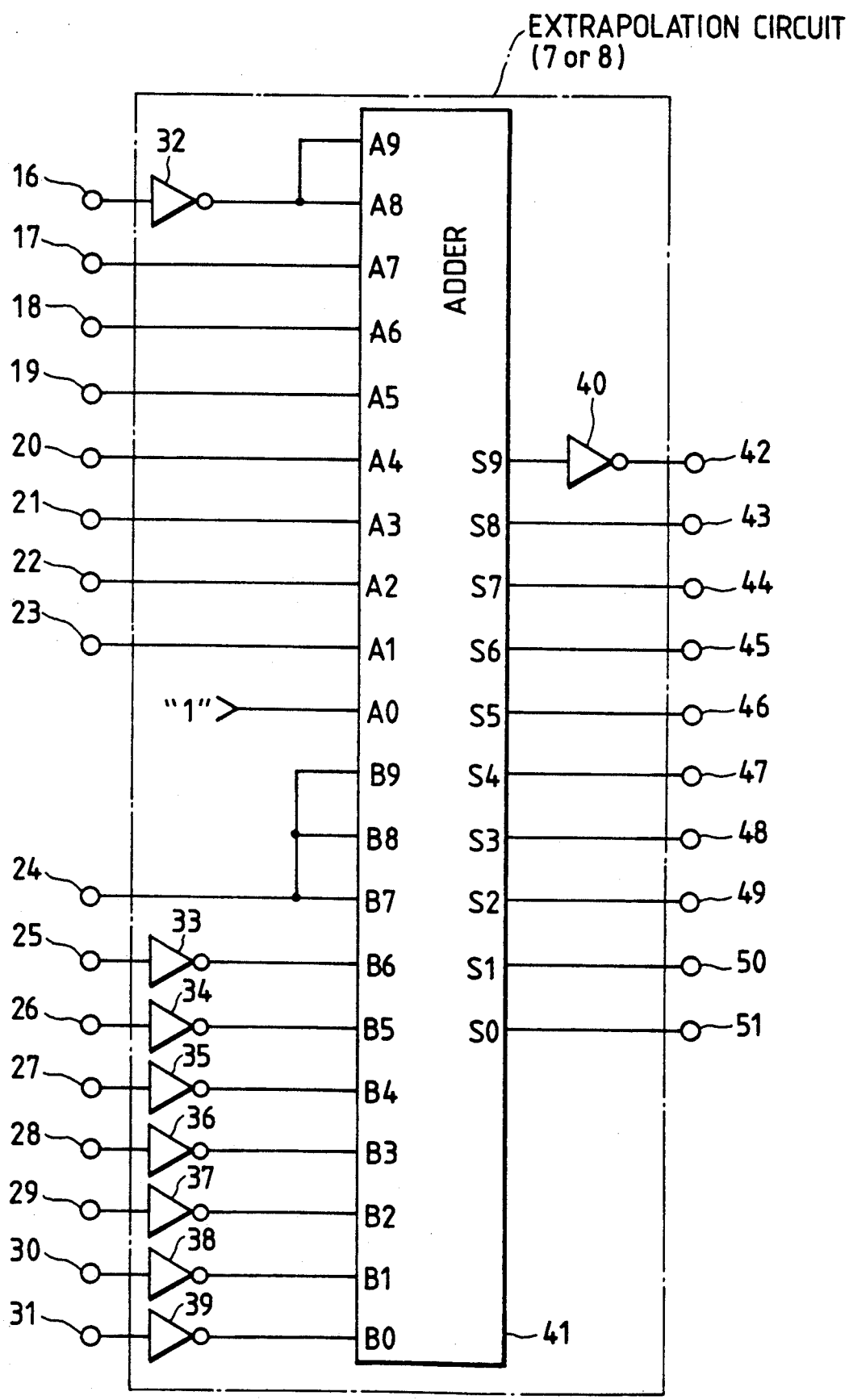
FIG. 2 is a circuit diagram showing an example of the structure of an extrapolation circuit of FIG. 1.

FIG. 2 is a circuit diagram showing a specific example of the extrapolation circuits 7 and 8 of FIG. 1.

In FIG. 2: reference numerals 16 to 23 designate adjacent data input terminals to which are inputted the individual bits of the adjacent sample data of the concealed sample data; numerals 24 to 31 designate next adjacent data input terminals to which are inputted the individual bits of the next adjacent sample data of the concealed sample data; numerals 32 to 40 designate inverters for logical negations; numeral 41 designates an adder for digital additions; and numerals 42 to 51 designate extrapolation output terminals for outputting the individual bits of the extrapolation values.

Thus, the extrapolation circuits 7 and 8 are individually equipped with the adjacent data input terminals 16 to 23 (i.e., 16, 17, 18, - - -, and so on from the MSB), the next adjacent data input terminals 24 to 31 (i.e., 24, 25, 26, - - -, and so on from the MSB), and the extrapolation value output terminals 42 to 51 (i.e., 42, 43, 44, - - -, and so on from the MSB) of 10 bits. The extrapolation circuits 7 and 8 determines the extrapolation values of the concealed sample data positions by subtracting the next adjacent data values from the twice of the adjacent data values. Since, therefore, the adjacent and next adjacent data are of 8 bits, the extrapolation values have a magnitude of 10 bits at the maximum, and the adder 41 is one having 10 bits.

The subtractions can be accomplished by adding twos complements. The adjacent data are inputted to the adjacent data input terminals 16 to 23 sequentially in the order from the MSB to the LSB so that the MSB is inverted by the inverter 32 and inputted to the MSB (A9) and next input (A8) of the one (A) side of the adder 41 of the 10 bits. Then, the bit of the adjacent data next to the MSB and the bits of the same to the LSB are inputted sequentially to the input (A7) of the A side of the adder 41 doubly next to the MSB and the inputs of the same to the input (A1) over the LSB by one. As a result, the straight binary type adjacent data of 8 bits are converted to the twos complement type and doubled before they are inputted to the adder 41.

On the other hand, the next adjacent data from the MSB to the LSB are inputted sequentially to the next adjacent data input terminals 24 to 31 such that the MSB is inputted to the MSB input (B9), the next input (B8) and the doubly next input (B7) of one (B) side of the adder 41 of 10 bits. Moreover, the bit next to the MSB and the bits to the LSB of the next adjacent data are inverted sequentially by the inverters 33 to 39 and inputted to the input (B6) triply next to the MSB and the inputs to the LSB input (B0) of the B side of the adder 41. Thus, the straight binary type next adjacent data of 8 bits are converted to the twos complement type so that they are subjected to ones complement operation and inputted to the adder 41.

For the subtractions, it is sufficient to make additions by subjecting a minuend to twos complement operation.

This operation may also be accomplished by subjecting it to ones complement operation and by adding 1.

For these alternations, in the example of FIG. 2, since the adjacent data are doubled and inputted, the fixed value 1 is inputted to the LSB input (A0) of the A side of the adder 41, to which the fixed value 0 is intrinsically inputted. This operation may be effected by inputting the fixed value 1 to the carry input of the adder.

As a result, the value, which is determined by subtracting the next adjacent data input from the twice of the adjacent data input, is obtained in the twos complement form from the output of 10 bits of the adder 41. The MSB output (S9) is inverted by the inverter 40 and outputted from the extrapolation output terminal 42. The output (S8) next to the MSB and the outputs to the LSB output (S0) of the adder 41 are outputted sequentially from the extrapolation value output terminals 43 to 51. As a result, the extrapolation values of the straight binary type are obtained at the extrapolation value output terminals 42 to 51.

When the sample data E to A of FIG. 5 are stored in the data registers 2 to 6 of FIG. 2 by the operations thus far described, the output of the extrapolation circuit 7 is (2·D−E), and the output of the extrapolation circuit 8 is (2·B−A). These outputs of the extrapolation circuits 7 and 8 are inputted to the averaging circuit 9 so that the interpolation value is determined.

Figure 3:
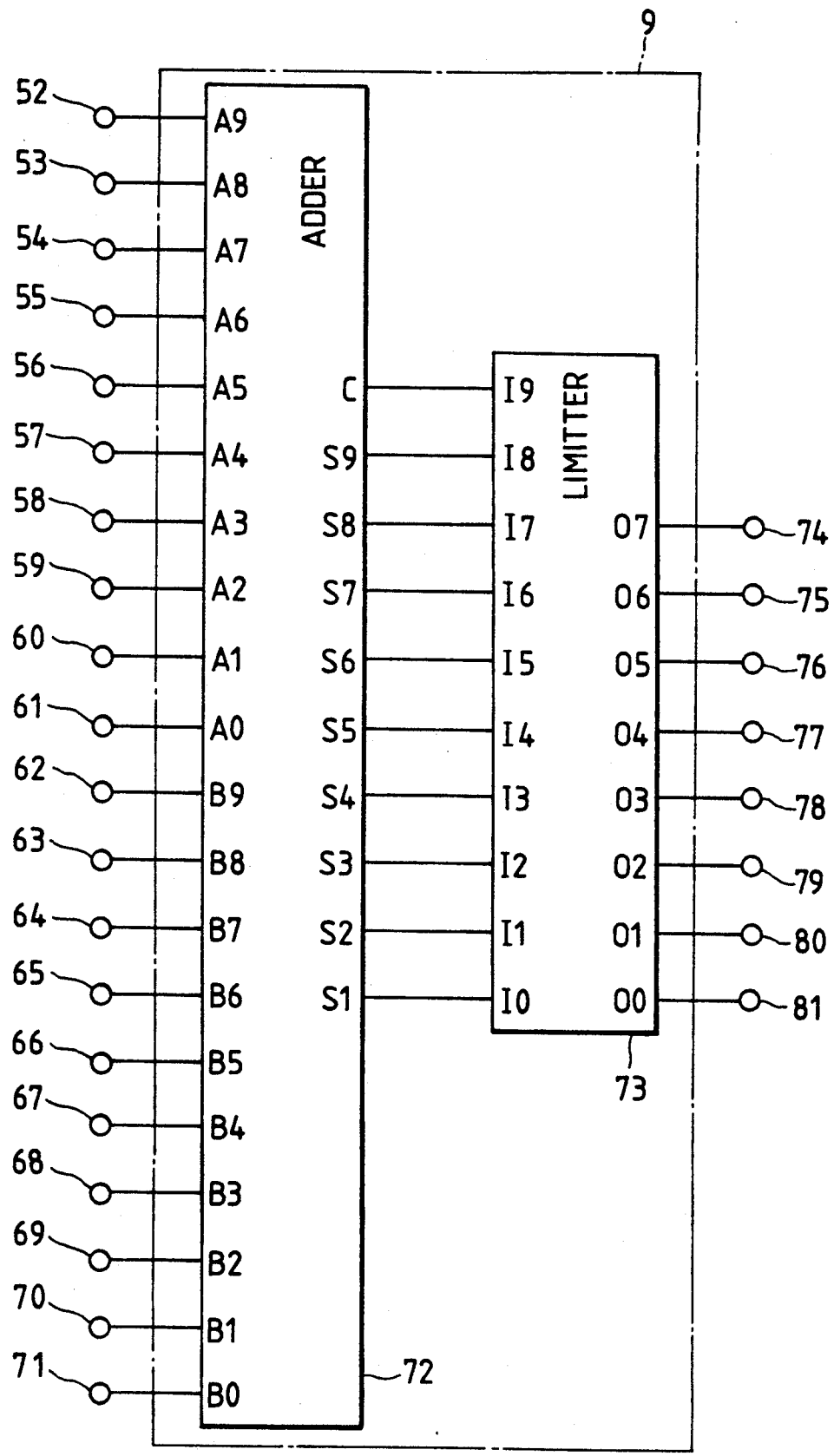
FIG. 3 is a circuit diagram showing an example of the structure of an averaging circuit of FIG. 1.

FIG. 3 is a circuit diagram showing a specific example of the averaging circuit 9 of FIG. 1.

In FIG. 3: reference numerals 52 to 61 designate extrapolation value input terminals to which are inputted the individual bits of the first extrapolation value; numerals 62 to 71 designate extrapolation input terminals B to which are inputted the individual bits of the second extrapolation value; numeral 72 designates an adder for digital addition; numeral 73 designates a limiter circuit for limiting the output within the dynamic range corresponding to a predetermined number of bits; and numerals 74 to 81 designate average value output circuits for outputting the individual bits of an average value.

The averaging circuit 9 has a structure shown in FIG. 3 such that the outputs from the MSB to the LSB of the extrapolation circuit 7 are inputted to the extrapolation input terminals A52 to 61 and to the MSB (A9) to the LSB (A0) of one (A) side of the adder 72 of 10 bits. Moreover, the MSB to the LSB of the outputs of the extrapolation circuit 8 are inputted to the extrapolation value input terminals B62 to 71, respectively, and to the MSB (B9) to the LSB (B0) of the input of the other (B) side of the adder 72 of 10 bits.

Since the addition values of these two inputs are of the straight binary type, they are obtained in 11 bits, the MSB of which is the carry output (C) of the adder 72. The outputs of the adder 72 from the output (S1) next to the LSB to the MSB output (S9) excepting the LSB output (S0) and the carry output (C) are inputted as the half value of the addition value, i.e., as the average value of the inputs of the adder 72 sequentially to the inputs from the LSB (I0) to the MSB input (I9).

The limiter circuit 73 operates the extrapolation value with the twos complements and has a subtracting procedure therein. Therefore, the average value obtained by the operations till now takes such a value that the values of the 256 steps in the dynamic range of 8 bits of the original data sample are positioned at the center of the dynamic range of the average value obtained with 10 bits. As a result, the value over the upper limit of the dynamic range of 8 bits is suppressed to the upper limit of 8 bits, and the value below the lower limit is suppressed to the lower limit of 8 bits so that the average value of 10 bits may be converted to the average value of 8 bits. Thus the limiter circuit 73 takes a structure shown in FIG. 4.

Figure 4:
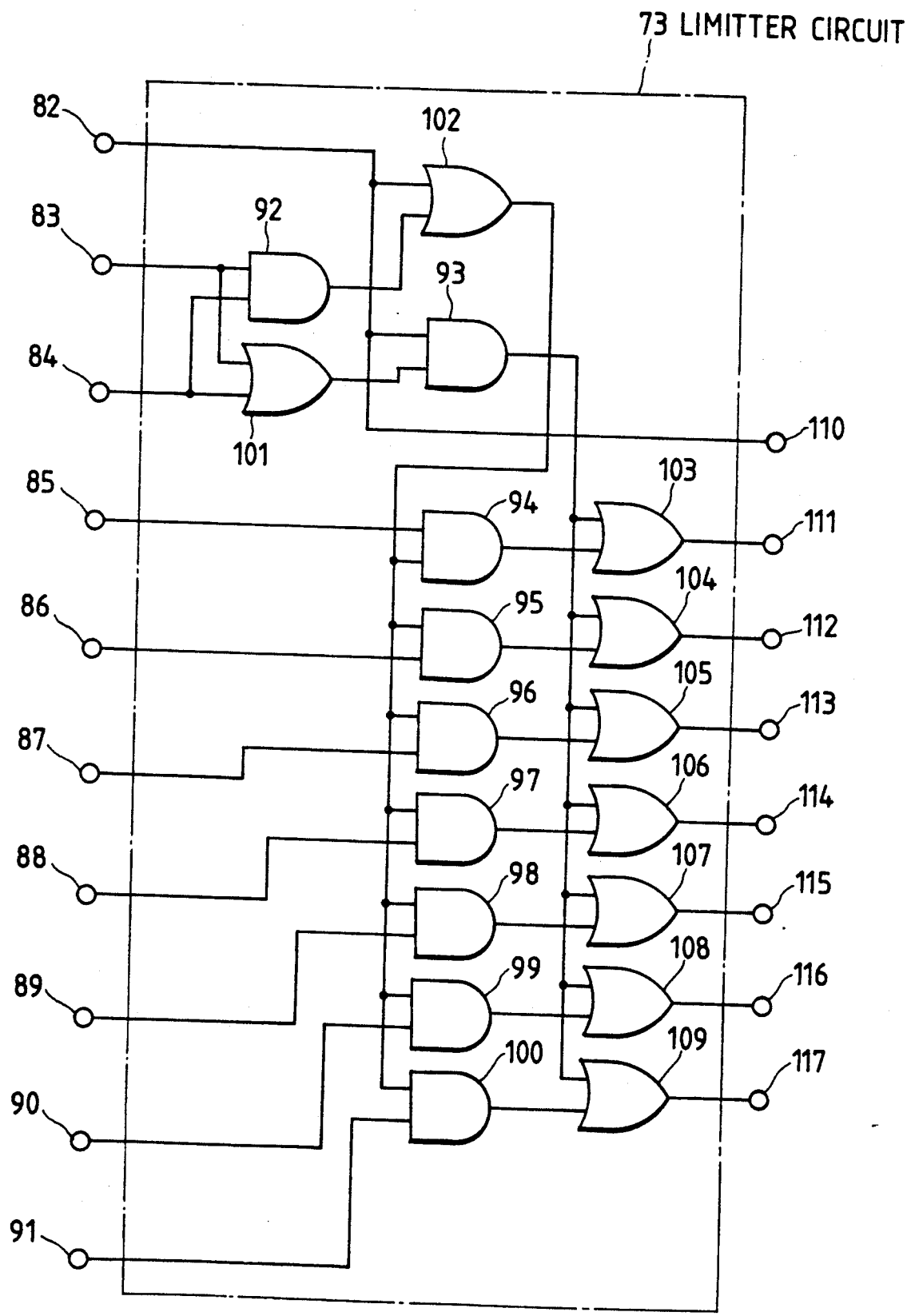
FIG. 4 is a circuit diagram showing an example of the structure of a limiter circuit of FIG. 3.

FIG. 4 is a circuit diagram showing a specific example of the limiter circuit of FIG. 3. In FIG. 4: reference numerals 82 to 91 designate input terminals to which are inputted individual binary bits; numerals 92 to 100 designate AND gates for taking logical products; numerals 101 to 109 designate OR gates for taking logical sums; and numerals 110 to 117 designate output terminals from which are outputted the individual bits limited to a predetermined bit number.

Of the average values coming from the adder 72 having dynamic ranges from "0000000000" to "1111111111" obtained in 10 bits, the dynamic range of 8 bits for the interpolation value is from "0110000000" to "1001111111" at the center, the range of which corresponds to that "00000000" to "11111111" of 8 bits.

In the limiter circuit shown in FIG. 4, the average values of 10 bits from the MSB to the LSB inputted to the inputs 19 to 10 of FIG. 3 are inputted sequentially to the input terminals 82 to 91, and the MSB (i.e., the input 19 of FIG. 3) inputted from the input terminal 82 is inputted as it is to the output terminal 110 (i.e., the output 07 of FIG. 3) and to the AND gate 93 and the OR gate 102.

The inputs (i.e., the inputs I8 and I7 of FIG. 3) next and doubly next to the MSB and inputted from the input terminals 83 and 84 are inputted together to the AND gate 92 and the 0R gate 101. The AND gate 92 takes the value "1" only when those bits are at "11", and OR gate 101 takes the value "0" only when at "00". The output of the AND gate 92 is inputted to the OR gate 102. As a result, the output of the OR gate 102 takes the value "1", in case the higher 3 bits of the average values of 10 bits inputted to the input terminals 82 to 91 are "011", "100", "101", "110" and "111", and takes the value "0" in other cases.

On the other hand, the output of the OR gate 101 is inputted to the AND gate 93. As a result, the output of the AND gate 93 takes the value "0", in case the higher 3 bits are "000", "001", "010", "011" and "100", and takes the value "1" in other cases. Of the average values of 10 bits, the inputs of the input terminals 85 to 91 of the lower 7 bits are inputted to the AND gates 94 to 100, respectively, the other terminals of which receive the output of the OR gate commonly. As a result, the outputs of the AND gates 94 to 100 wholly take the value "0", in case the upper 3 bits of the average value inputs of 10 bits are "000", "001" and "010", and output the inputs of the input terminals 85 to 91 in other cases.

The outputs of those AND gates 94 to 100 are inputted to the OR gates 103 to 109, respectively, the other inputs of which receive the output of the AND gate 93 commonly. As a result, the outputs of those OR gates 103 to 109 wholly take the value "1", in case the higher 3 bits of the average input of 10 bits are "101", "110" and "111", and output the outputs of the AND gates 94 to 100, as they are, to the output terminals 111 to 117, respectively, in other cases.

As a result, in the limiter circuit 73 of FIG. 3: the output value of 8 bits from O7 (MSB) to O0 (LSB) is "00000000" in case the input value of 10 bits from the I9 (MSB) to I0 (LSB) is from "0000000000" to "0101111111"; the output value is from "00000000" to "11111111" in case the input value is from "0110000000" to "1001111111"; and the output value is "11111111" in case the input value is from "1010000000" to "1111111111". These output values are outputted as the average values of 8 bits to the average value output terminals 74 to 81, respectively.

Figure 6A:
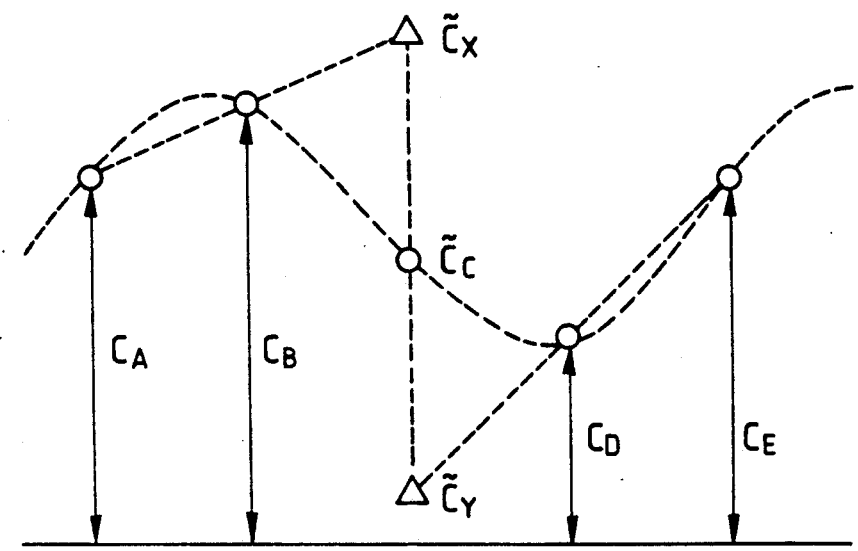
Figure 6B:
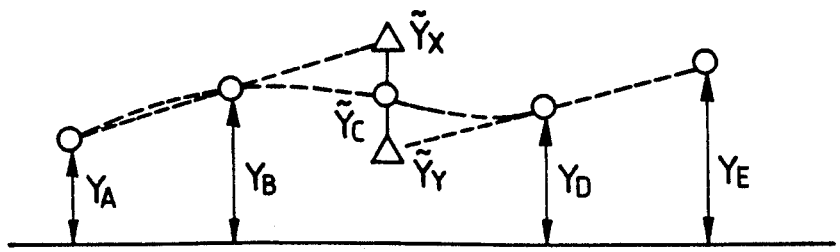

As specified above, if the outputs of the extrapolation circuits 7 and 8 of FIG. 1 are $(2D-E)$ and $(2B-A)$, respectively, the output of the averaging circuit 9 takes the value of $(B+D-A/2-E/2)$. If the individual sample data values A, B, D and E are divided into color signal components $C_A$, $C_B$, $C_D$ and $C_E$ and luminance signal components $Y_A$, $Y_B$, $Y_D$ and $Y_E$, as shown in FIGS. 6($a$) and 6($b$), the extrapolation values $(2D-E)$ and $(2B-A)$ are indicated at $(\tilde{C}_y+\tilde{Y}_y)$ and $(\tilde{C}_x+Y_x)$, and their average value $(B+D-A/2-E/2)$ is expressed by $(\tilde{C}_c+Y_c)$, i.e, the highly accurate interpolation value of the sample data C, as has been described hereinbefore.

The output of the averaging circuit 9 is inputted to the data selector 10 of FIG. 1, the other input of which receives the output of the data register 4. If, moreover, the sample data (i.e., C of FIG. 5) of the data register 4 has no uncorrectable error, the output of the latch 15 connected with the control terminal of the data selector 10 is at the value "0" so that the data selector 10 outputs the output of the data selector 4 as it is to the data output terminal 11. If, the sample data C has an uncorrectable error, as shown in FIG. 5, the error flag of the latch 15 is at the value "1" so that the data selector 10 is switched to output the interpolation value $(\tilde{C}=\tilde{C}_c+Y_c)$ to the data output terminal 11.

The highly accurate interpolation thus far described can be accomplished if the phase relations of a sample data, which is to be interpolated, and four sample data used to obtain an interpolation value, with respect to the color subcarrier are similar to those of A to E of FIG. 5; more specifically, if there are four sample data having the sampling phases of $\phi-180°, \phi-90°, \phi+90°$ and $+180° (=\phi-180°)$ of the color subcarrier in the case of the screen having no hue, where $\phi$ is a concealed sample data.

Figure 7:
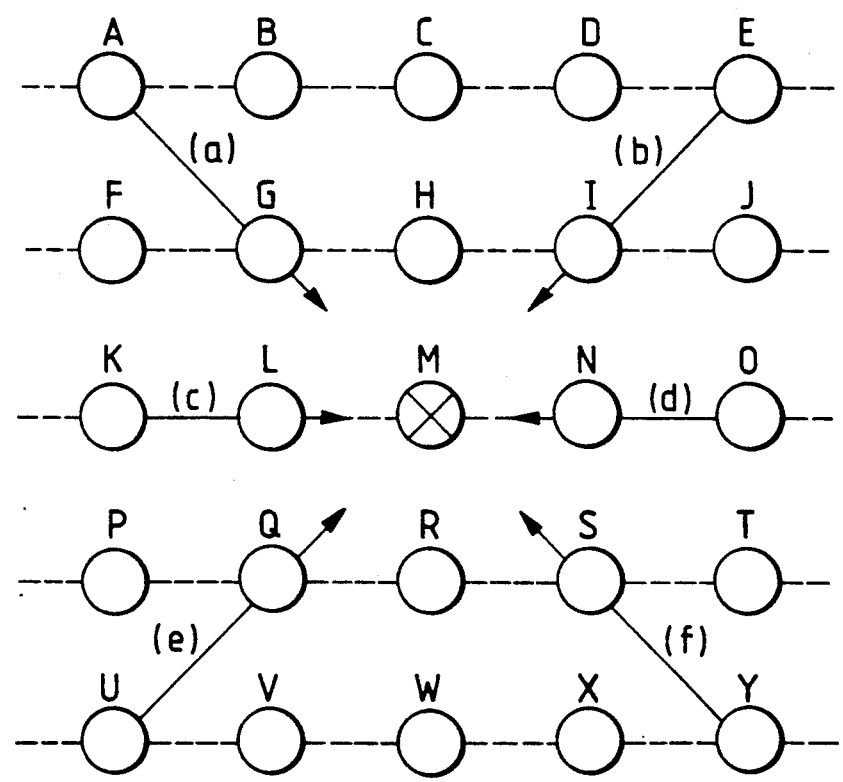
Figure 8:
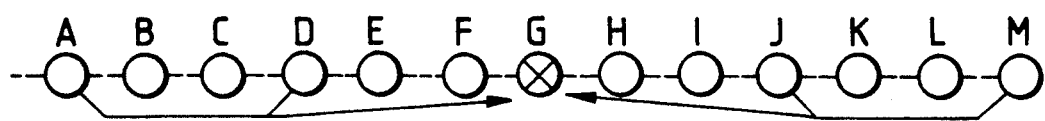

Examples of combination of the sample data, which can be interpolated highly accurately according to the present invention, are shown in FIGS. 7 and 8. FIG. 7 shows sample data arranged on two upper and lower lines and two right and left columns with a sample data M as the center on the screen displaying video signals. In case the NTSC composite signals are sampled with the sampling frequency four times as high as the color subcarrier: the sample data A, E, K, 0, U and Y take the sampling phase of $\phi-180° (=\phi+180°)$; the sample data I, L and S take the sampling phase of $\phi-90°$; and the sample data G, N and Q take the sampling phase of $\phi+90°$, if the sampling phase of the sample data M is designated as $\phi$.

As a result, in case the sample data M has an uncorrectable error, it is possible to accomplish highly accurately: the interpolation by the average value (which will be referred to as the combination of the sample data (a) and (f)) of the extrapolation value of the sample data A and G (i.e., the combination (a)) and the extrapolation data S and Y (i.e., the combination of (f); the interpolation by the combination of the (b) and (e) by the sample data E, I, Q and U; the interpolation by the combination of (a) and (b) by the sample data A, G, E and I; the interpolation by the combination of (a) and (c) by the sample data A, G, K and L; the interpolation by the combination (b) and (d) by the sample data E, I, N and 0; the interpolation by the combination of (c) and (e) by the sample data K, L, Q and U; the interpolation by the combination of (d) and (f) by the sample data N, O, S and Y; and the interpolation by the combination (e) and (f) by the sample data U, Q, S and Y.

If, moreover, the sampling phase of the sample data G of FIG. 8 is designated as $\phi$, as shown in FIG. 8 the sample data A is expressed by $\phi-540° (=\phi-180°)$; the sample data D is expressed by $\phi-270° (=\phi+90°)$; the sample data J is expressed by $\phi+270° (=\phi90°)$; and the sample data M is expressed by $\phi+540° (=\phi-180°)$. These sample data can be combined to interpolate the sample data G with relatively high accuracy.

In connection with the embodiments of FIGS. 9 to 11, the variations of the interpolation circuit by the combinations of other sample data will be partially described in the following.

Figure 9:
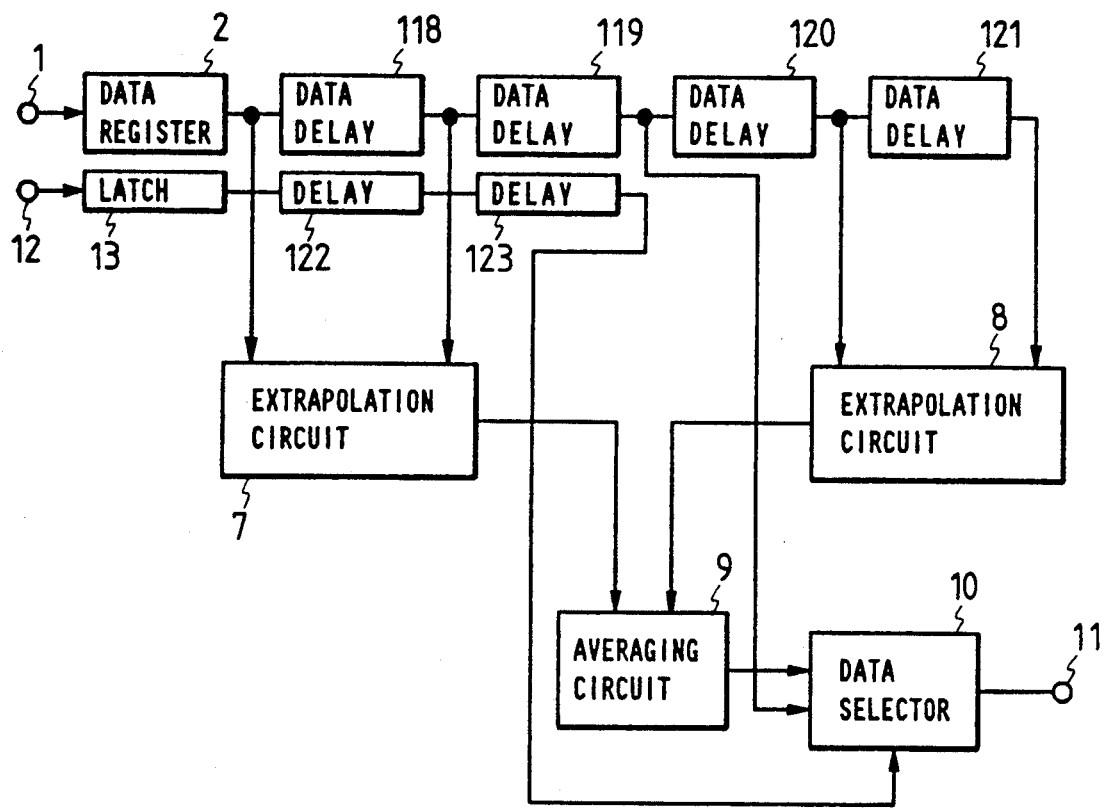
FIGS. 9 to 16 are block diagrams showing other embodiments of the present invention, respectively.

FIG. 9 is a block diagram showing another embodiment of the interpolation circuit according to the present invention. In FIG. 9, reference numerals 118 to 121 designate data delay circuits for delaying the sample data of 8 bits by a predetermined number of samples, and numerals 122 and 123 designate delay circuits for delaying an error flag by a predetermined number of bits.

From the data input terminal 1 of FIG. 9, there is inputted an image sample data which is prepared by sampling the NTSC composite video signal with a frequency four times as high as that of the color subcarrier and by transmitting the sampled video signal. The sample data are inputted sequentially starting with the upper most line and in the left-to-right direction on each line. The sample data inputted from the data input terminal 1 is first inputted to and stored in the data register 2, the output of which is inputted to the data delay circuit 118.

The output of the data delay circuit 118 is inputted to the data delay circuit 119, the output of which is inputted to the data delay circuit 120, the output of which is inputted to the data delay circuit 121. Each of these data delay circuits 118 to 121 has a delay value of one line and one sample.

In case the NTSC composite signal is sampled with a frequency four times as high as that of the color subcarrier, the data delay circuits 118 to 121 have 911 samples of delay value so that they can be constructed of shift registers and memories because the number of the sample data of one line is 910.

When the signal as shown in FIG. 7 is inputted from the data input terminal 1 so that the sample data Y is inputted to and stored in the data register 2, the sample data S, M, G and A appear at the outputs of the data delay circuits 118, 119, 120 and 121, respectively.

On the other hand, the error flags corresponding to the individual image sample data inputted are inputted from the flag input terminal 12 and further to the latch 13. The error flags stored in the latch 13 are outputted to the delay circuit 122, the output of which is inputted to the delay circuit 123. The delay circuits 122 and 123 have relay values equal to those of the data delay circuits 118 and 119, respectively. As a result, the delay circuits 122 and 123 have delay values of 911 bits in the present embodiment in which the delay values of the data delay circuits 118 and 119 are 911 samples. When, moreover, the sample data M appears at the output of the data delay circuit 119, its error flag appears at the output of the delay circuit 123 so that the values "1" is outputted when the sample data M has the uncorrectable error, and "0" when not.

The output of the data register 2 is inputted to the next adjacent data input terminal of the extrapolation circuit 7, and the output of the data delay circuit 118 is inputted to the adjacent data input terminal of the extrapolation circuit 7. Moreover, the output of the data delay circuit 120 is inputted to the adjacent data input terminal of the extrapolation circuit 8, and the output of the data delay circuit 121 is inputted to the next adjacent data input terminal of the extrapolation circuit 8.

As a result, if the extrapolation circuits 7 and 8 and the averaging circuit 9 are made to have the same structures as those of the embodiment of FIG. 1, the interpolation value by the combination of (a) and (f) of FIG. 7 is obtained at the output of the averaging circuit 9 and inputted to the data selector 10. This value is the highly accurate interpolation value of the sample data M, as has been described hereinbefore. The other input terminal 12 of the data selector 10 receives the transmission value of the sample data M, i.e., the output of the data delay circuit 119, and the control terminal of the data selector 10 receives the output of the delay circuit 123 to which is outputted the error flag of the sample data M.

As a result, the data selector 10 accomplishes the highly accurate interpolations like the embodiment of FIG. 1 by outputting the transmission value of the sample data M as it is, if the sample data M has no uncorrectable error, and the interpolation value of the averaging circuit 9 from the data output terminal if the sample data M has the uncorrectable error.

If the delay values of the data delay circuits 118 to 121 and delay circuits 122 and 123 of the embodiment of FIG. 9 are one line minus one sample, i.e., 909 samples or 909 bits, the interpolations by the combination of (b) and (e) of FIG. 7 can be accomplished. If the delay values are three samples or bits, on the other hand, the error of the sample data G can be interpolated with the sample data A, D, J and M, as shown in FIG. 8.

Figure 10:
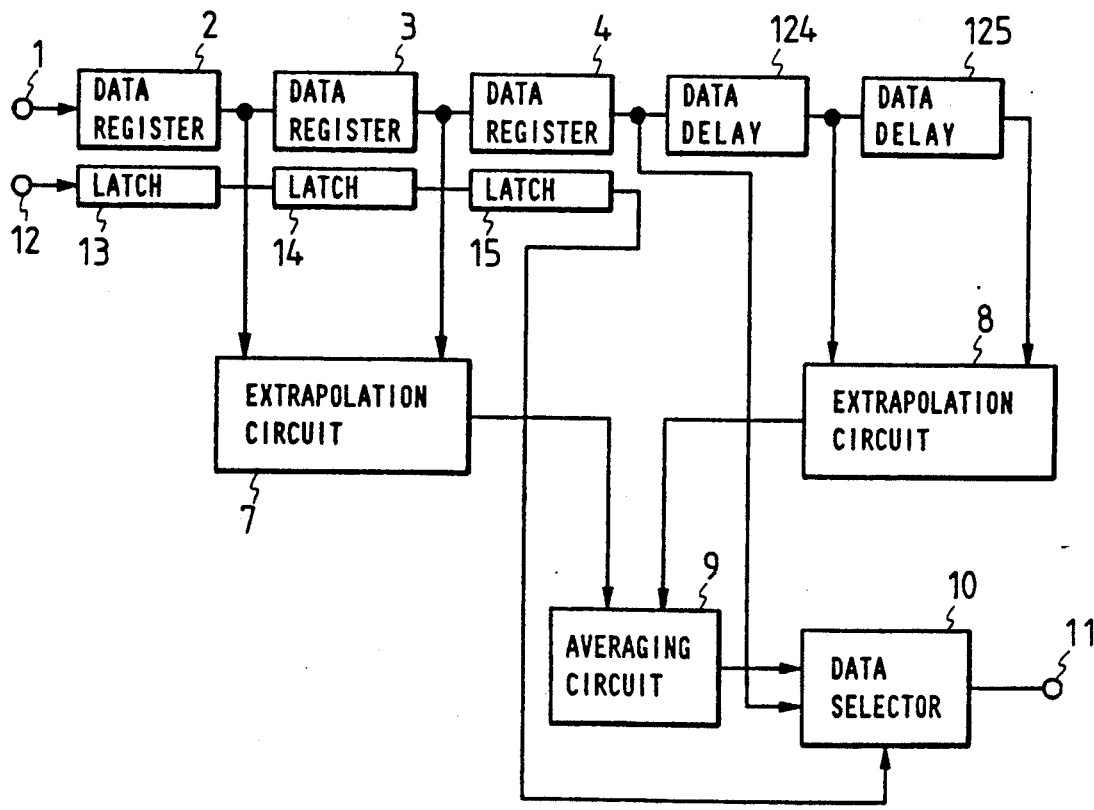
Figure 11:
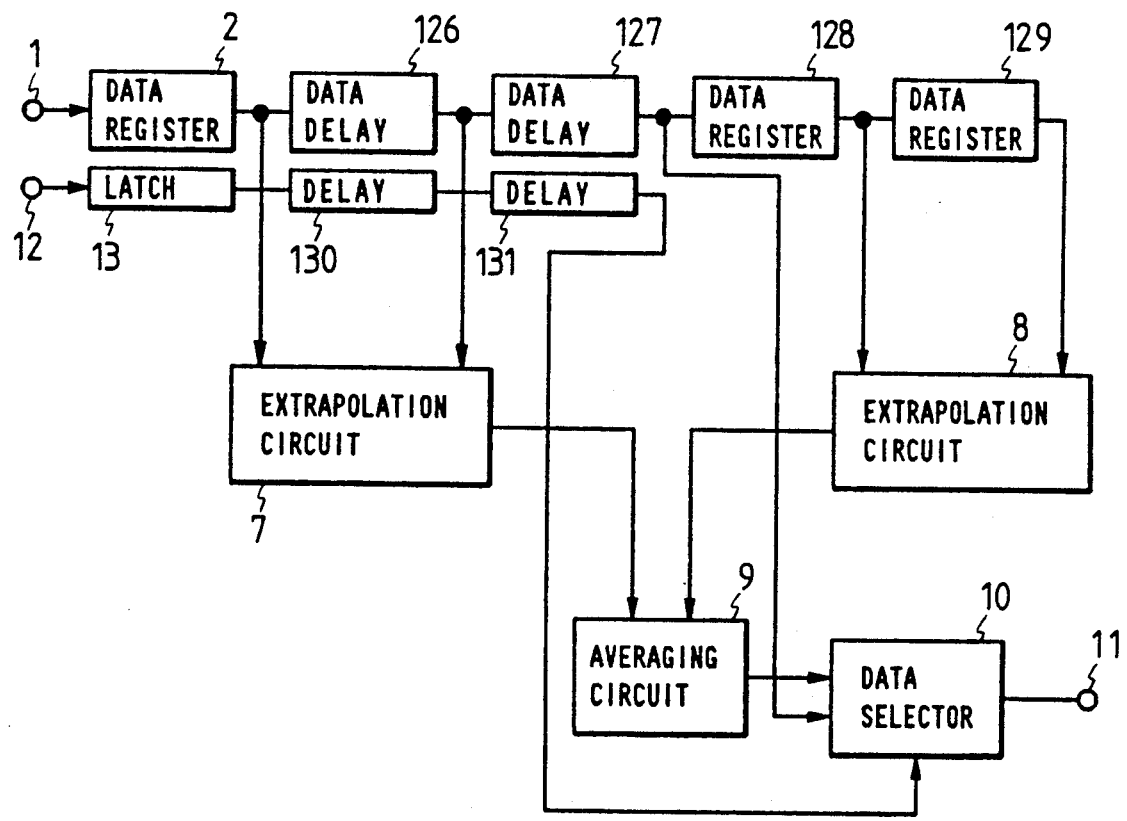

FIGS. 10 and 11 are block diagrams showing other modified embodiments (or variations) of the present invention, respectively. The embodiment of FIG. 10 is modified such that the data registers 5 and 6 of the embodiment of FIG. 1 are replaced by data delay circuits 124 and 125 which have delay values of (one line—one sample), i.e., 909 samples.

In the embodiment of FIG. 10, if the sample data, as shown in FIG. 7, and its error flag are inputted from the data input terminal 1 and the flag input terminal 12, respectively, so that the sample data 0 is inputted to and stored in the data register 2, the data registers 3 and 4 and the data delay circuits 124 and 125 have the outputs N, M, I and E, respectively. As a result, the interpolation value by the combination of (b) and (d) of FIG. 7 is operated so that the sample data M is concealed, if it has the uncorrectable error, by the data selector 10 and is outputted from the data output terminal 11.

The embodiment of FIG. 11 is modified such that the data delay circuits 124 and 125 of the embodiment of FIG. 9 are replaced by data registers 126 and 127, respectively. The data delay circuits 126 and 127 and delay circuits 130 and 131 corresponding to the data delay circuits 118 and 119 and the delay circuits 122 and 123 of FIG. 9 have delay values (one line—one sample), i.e., 909 samples.

If, in the embodiment of FIG. 11, the sample data, as shown in FIG. 7, and its error flag are inputted from the data input terminal 1 and the flag input terminal 12, respectively, so that the sample data U is inputted to and stored in the data register 2, the outputs of the data delay circuits 126 and 127 and data registers 128 and 129 are the sample data Q, M, L and K, respectively.

As a result, the interpolation value by the combination of (c) and (e) of FIG. 7 is operated by the extrapolation circuits 7 and 8 and the averaging circuit 9 so that the sample data M is concealed by the data selector 10, if it has the uncorrectable error, and outputted from the output terminal 11. . As has been described hereinbefore, according to the present invention, the concealing can be accomplished highly accurately by the various combinations of the four sample data. Incidentally, the correct (or accurate) interpolation value is not obtained in case the sample data used for the concealing operation has the uncorrectable error.

In such case, therefore, the concealing operation can be switched to another to avoid the serious deterioration of the interpolation accuracy. For example, the averaging interpolation is used, in which the accuracy is low, in case the color saturation is high, and is acceptable in case the color saturation is low. Since the averaging interpolation has as few as two sample data to be used for the operations, they are not likely to have uncorrectable errors.

Figure 12:
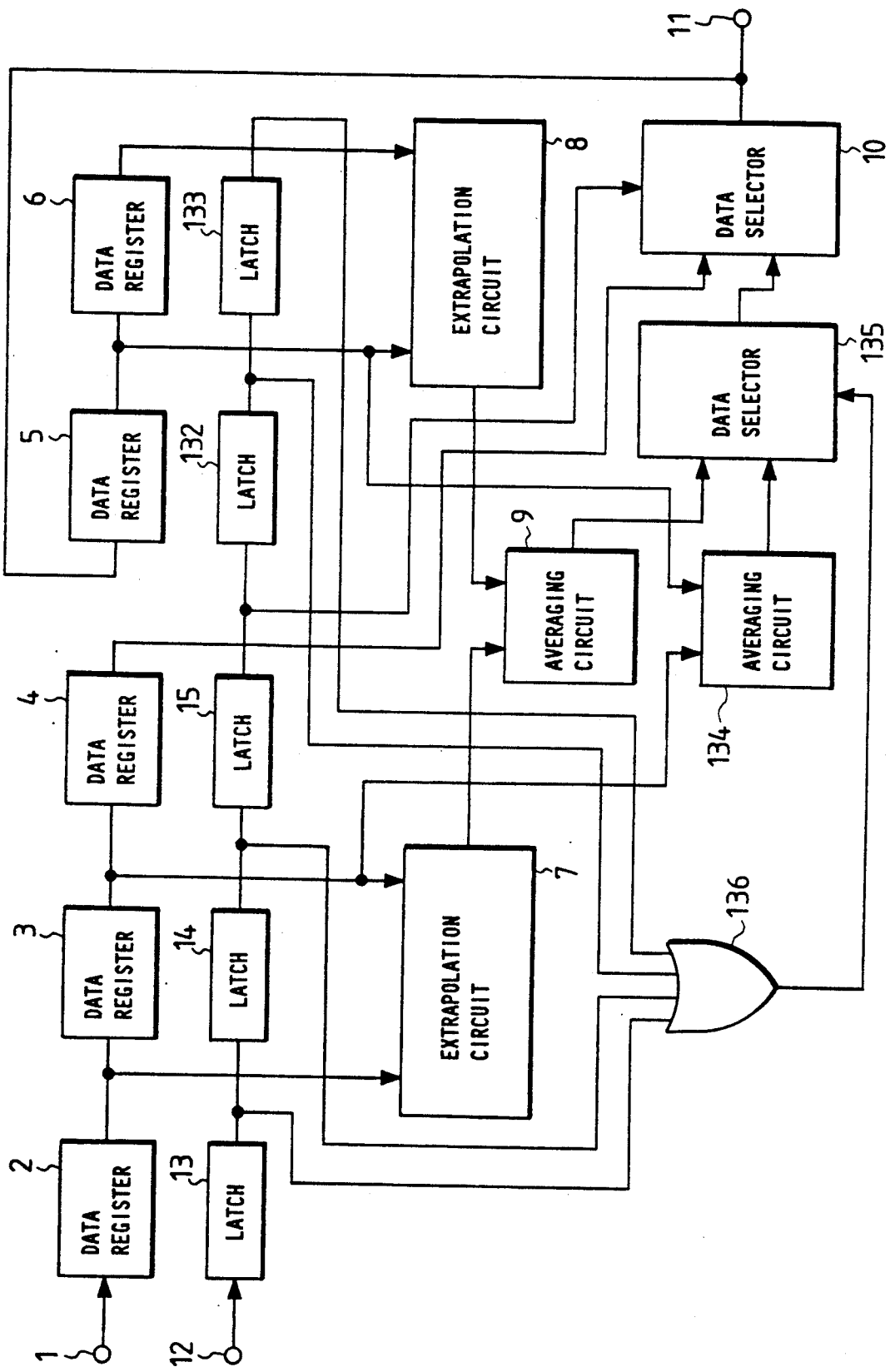

FIG. 12 is a block diagram showing one embodiment of the interpolation circuit having an interpolation type switching function according to the present invention.

In FIG. 12: reference numerals 132 and 133 designate latches for the error flags; numeral 134 an averaging circuit for determining the interpolation value of the averaging interpolation; numeral 135 designates a data selector for switching the interpolation value; and numeral 136 designates an OR gate for checking the error flags whether or not the four sample data used for determining the interpolation value with the averaging value of two extrapolation values have the uncorrectable errors.

Unlike the embodiment of FIG. 1, the sample data after the concealing operation, i.e., the output of the data selector 10 is inputted to the data registers 5 and 6 so that the interpolations can be accomplished with the concealed data in the case of the averaging interpolations. In order to prevent the interpolations using the concealed value while stressing the accuracy in the case of the interpolations by the average value of the extrapolation value using four sample data, there are provided the latches 132 and 133 for storing the error flags for checking whether or not the uncorrectable errors are generated in the data of the data registers 5 and 6. Thus, the output of the latch 15 is inputted to the latch 132, the output of which is inputted to the latch 133.

From the data input terminal 1 and flag input terminal 12 of FIG. 12, respectively, there are inputted the sample data, as shown in FIG. 5, and the corresponding error flag. When the sample data E is inputted to and stored in the data register 2, the sample data D, C, B and A are stored, like the embodiment of FIG. 1, in the data registers 3, 4, 5 and 6, respectively, and the error flags corresponding respectively to the sample data E, D, C, B and A are stored in the latches 13, 14, 15, 132 and 133, respectively. Since the connections between the inputs of the extrapolation circuits 7 and 8 and the averaging circuit 9 are similar to those of the embodiment of FIG. 1, the output of the averaging circuit 9 takes the interpolation value of sample data C concealed by the sample data A and B and by the sample data D and E as in the embodiment of FIG. 1.

On the other hand, the input of the averaging circuit 134 is the outputs of the data registers 3 and 5. In this case, the sample data B and D are inputted. As a result, the output of the averaging circuit 134 is (B+D)/2, i.e., the concealed value of C by the averaging interpolation.

All the outputs of the latches 13, 14, 132 and 133 storing the error flags of the sample data E, D, B and A for operating the interpolation value with the average value of the extrapolation value are inputted to the OR gate 136, which outputs the value "1", if any one of the four sample data of the sample data A, B, D and E has the uncorrectable error, and the value "0" if not. The output of the OR gate 136 is inputted to the control terminal of the data selector 135, to which is inputted the average value interpolation value of the sample data C and the average value of the interpolation value. As a result, the data selector outputs the average value interpolation value to the data selector 10, if any one of the four sample data A, B, D and E has the uncorrectable error, and the highly accurate interpolation value by the average value of the extrapolation value as in the embodiment of FIG. 1 if not.

The outputs of the data register 4 and the latch 15 are inputted as in the embodiment of FIG. 1 to one input and the control terminal of the data selector 10 and are outputted as they are to the data output terminal 11 if the sample data C has no uncorrectable error. if the sample data C has the uncorrectable error, on the other hand, the interpolation value from the data selector 135 is outputted to the data output terminal 11.

As has been described hereinbefore, according to the present embodiment, the highly accurate interpolation with the average value of the extrapolation values determined from the four sample data A, B, D and E is accomplished if the four sample data have no uncorrectable error. If the four sample data have one or more uncorrectable errors, the interpolation with the average value of the two sample data B and D is accomplished. Thus, the uncorrectable error caused in the sample data C can be concealed as accurately as possible under any circumstance.

Figure 13:
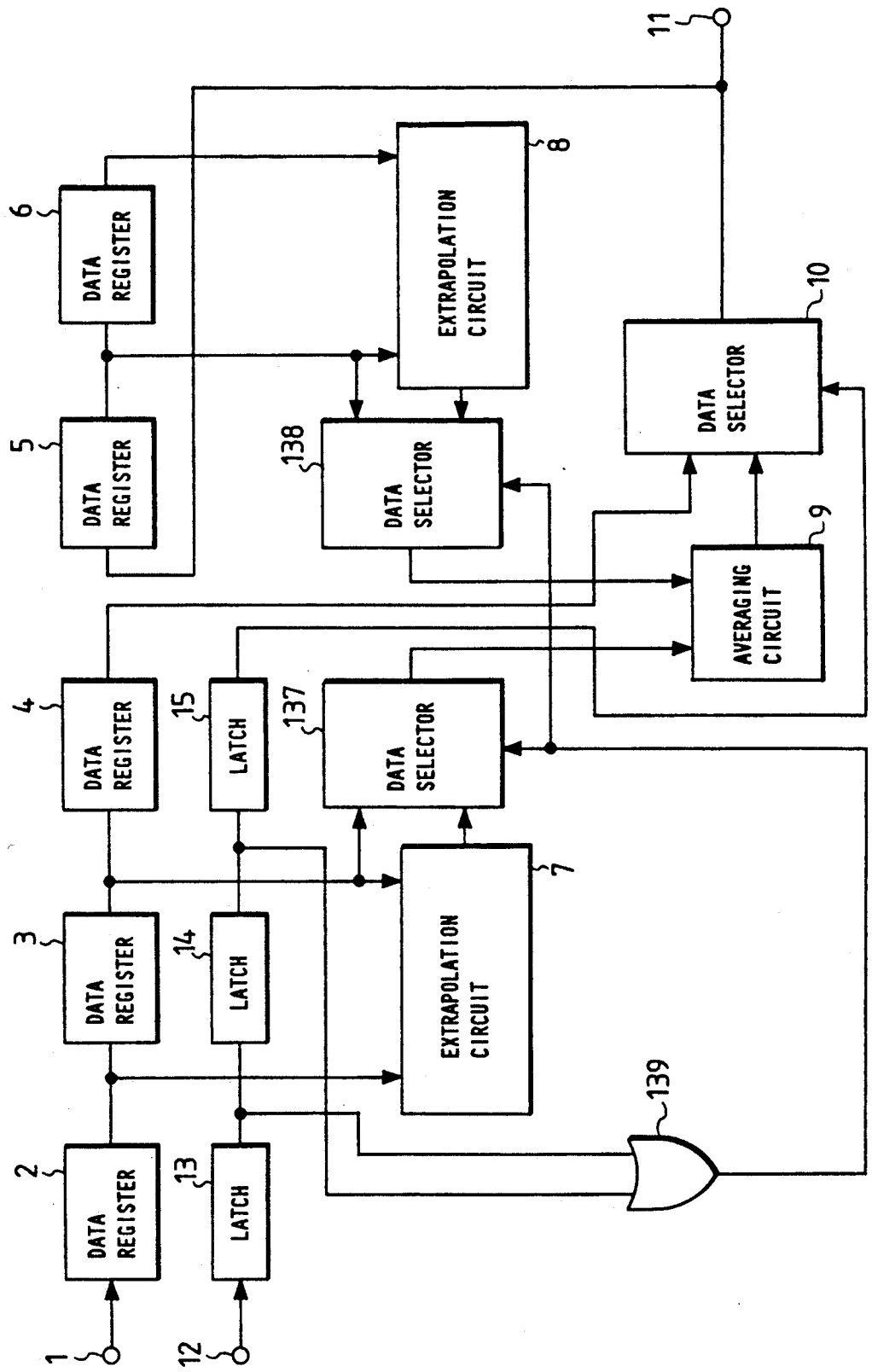

In FIG. 13, there is shown an embodiment having another structure for switching the interpolation with the average value of the extrapolation values and the averaging interpolation. In FIG. 13, reference numerals 137 and 138 designate data selectors for switching the input to the averaging circuit between the extrapolation value and the adjacent sample value, and numeral 139 designates an OR gate for checking whether or not the operation data for determining the extrapolation value has the uncorrectable error.

In the embodiment of FIG. 13, unlike FIG. 12, the interpolation value is switched between the average value of the extrapolation values and the average value of the adjacent sample data by switching the input to the averaging circuit 9 between the outputs of the extrapolation circuits 7 and 8 and the outputs of the data registers 3 and 5 by the data selectors 137 and 138. Even if, moreover, the data for operating the extrapolation values has a concealed value, the average value of the extrapolation values is sued as it is as the concealed value so that the possibility of the averaging interpolation of low accuracy may be reduced. Therefore, the check of the error flags is accomplished by inputting only the two outputs of the latches 13 and 14 to the OR gate 139. (Since all the correct sample data of the data registers 5 and 6 are concealed, their flags need not be checked.)

The sample data, as shown in FIG. 5, and their corresponding error flags are inputted from the data input terminal 1 and the flag input terminal of FIG. 13, respectively. When the sample data E is inputted to and stored in the data register 2, the sample data D to A are stored as in the embodiment of FIG. 12 in the data registers 3 to 6, respectively, and the error flags respectively corresponding to the sample data E to C are stored in the latches 13 to 15, respectively. Moreover, the outputs of the extrapolation circuits 7 and 8 are (2·D−E) and (2·B−A), respectively, as in the embodiment of FIG. 1.

The inputs of the data selectors 137 and 138 are the outputs of the extrapolation circuits 7 and 8 and the outputs of the data registers 3 and 5, and the output of the OR gate 139 is inputted to the control terminals of the data selectors 137 and 138. The OR gate 139 is fed with the outputs of the latches 13 and 14, i.e., the error flags corresponding to the sample data E and D so that its output takes the value "1" if at least one of the sample data E and D has the uncorrectable error. As a result, the data selectors 137 and 138 output the output of the extrapolation circuits 7 and 8, if any of the sample data E and D has not error, and the outputs of the data registers 3 and 5 to the averaging circuit 9 if any.

As a result, the output of the averaging circuit 9 is the average value of the extrapolation values, if any of the sample data E and D has no error, and the average value of the adjacent sample data, if any, and is outputted to the data selector 10. The data selector 10 is controlled as in the embodiments of FIGS. 1 and 12 by the output of the latch 15. The value of the sample data C is outputted to the data output terminal 11 and the data register 5, if the sample data C or the output of the data register 4 has no error, and the interpolation value of the averaging circuit 9 is outputted if any.

As has been described hereinbefore, in the embodiment of FIG. 13 as well, the average value of the extrapolation values by the four sample data A, B, D and E and the average value of the two sample data B and D can be selected for the sample data C depending upon the occurrence of the uncorrectable error.

In either of the embodiments of FIGS. 12 and 13, the interpolations by the adjacent and next adjacent sample data on a common line are switched. Despite this fact, however, this method of switching between the average value of the extrapolation values and the average value of the adjacent sample data can naturally be applied to another interpolation method by the combination of the sample data, as in the embodiments of FIGS. 9, 10 and 11.

Moreover, the improvement in the interpolation accuracy is effected by switching the average values of the extrapolation values according to the error occurrence situation by the combination of the various sample data combination, as shown in FIG. 7. Embodiments of the type for interpolations by switching the average values of several kinds of extrapolation values will be described in the following with reference to FIGS. 14, 15 and 16.

Figure 14:
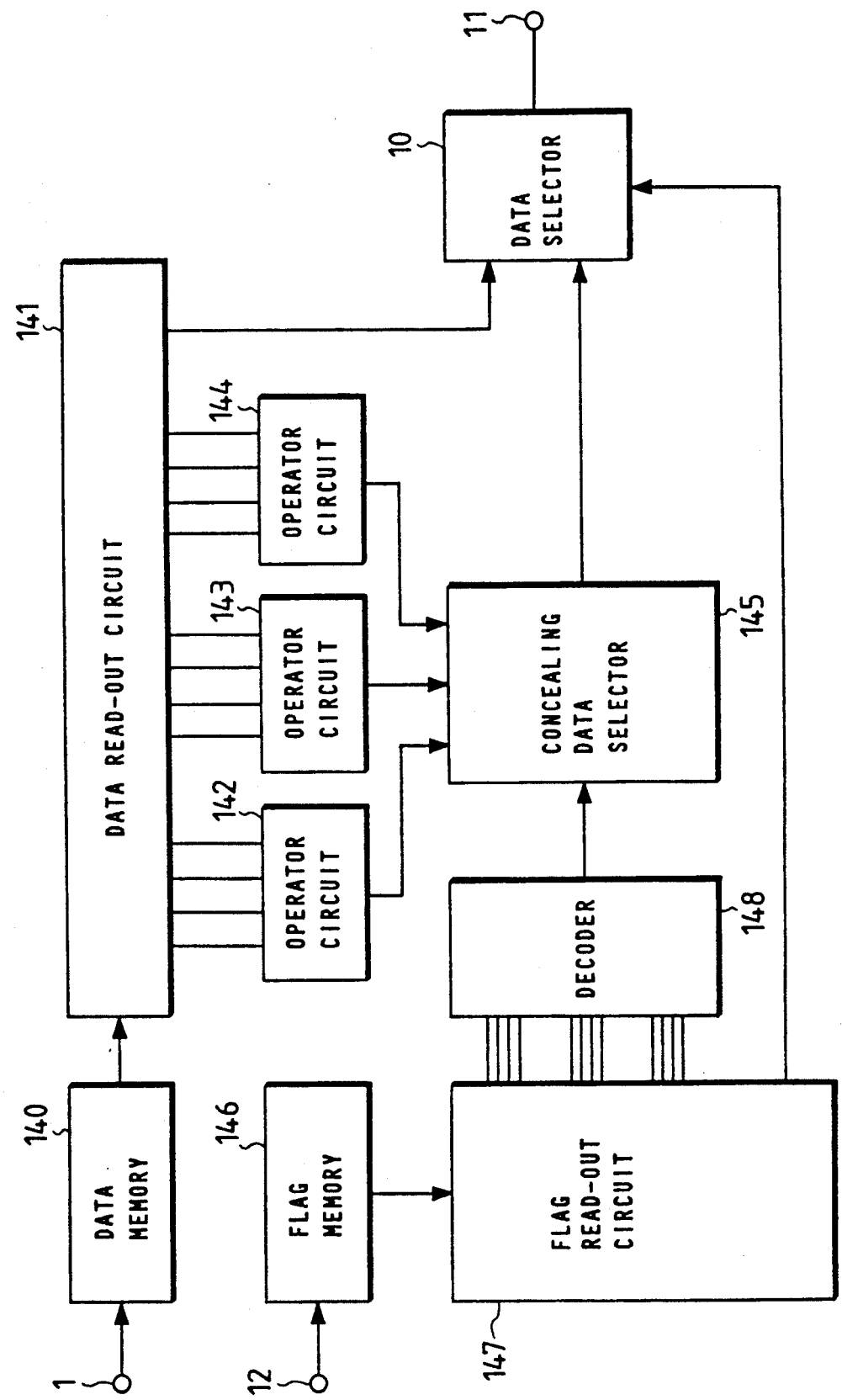

FIG. 14 is a block diagram showing one embodiment of the method for switching three kinds of interpolations. Here, the interpolation methods are switched among the interpolations of three kinds: the interpolation by the combination of (a) and (f) shown in FIG. 7; the interpolation by the combination of (c) and (d); and the interpolation by the combination of (b) and (e).

In FIG. 14: reference numeral 140 designates a data memory; numeral 141 designates a data readout circuit; numerals 142, 143 and 144 designate operator circuits composed of two extrapolation circuits and one averaging circuit for operating the interpolation values; numeral 145 designates concealing data selector for switching the interpolation values of three kinds; numeral 146 designates a flag memory for storing the error flags; numeral 147 designates a flag read-out circuit; and numeral 148 designates a decoder.

The image sample data and error flags inputted from the data input terminal 1 and the flag input terminal 12 of FIG. 14 are temporarily stored in the data memory 140 and the flag memory 146, respectively. The data memory 140 is controlled by the data read-out circuit 141 to have its data suitably read out so that the sample data A, G, S and Y, the sample data K, L, N and O, and the sample data U, Q, I and E may be outputted to the operator circuits 142, 143 and 144, respectively, when the sample data M of FIG. 7 is outputted to the data selector 10. The operator circuits 142, 143 and 144 are made to have the same structures as those of the extrapolation circuits 7 and 8 and the averaging circuit 9 of FIG. 1 and to output the interpolation value by the combination of (a) and (f) of FIG. 7, the interpolation value by the combination (c) and (e) and the interpolation value by the combination (b) and (e) to the concealing data selector 145.

On the other hand, the flag read-out circuit 147 reads out the error flags suitably from the flag memory 146 so that the data read-out circuit 141 may output the error flags of the sample data M to the control terminal of the data selector 10 and the error flags of the sample data A, G, S, Y, K, L, N, O, U, Q, I and E to the decoder 148 in accordance with the timing for outputting the sample data M. The decoder 148 checks the error flags of the aforementioned individual sample data so that it switches the concealing data selector 145 to select the interpolation value by the combination (c) and (d) of the operator circuit 143, if the sample data K, L, N and O have no error, and to select the interpolation value by the combination of (a) and (f) of the operator circuit 142 if those sample data have the errors and if the sample data A, G, S and Y have no error. If any of the sample data A, G, S and Y has the error, the concealing data selector 145 is switched to select the interpolation value by the combination of (b) and (e) of the operator circuit 144.

As has been described hereinbefore, the output of the concealing data selector 145 is any of the interpolation values by the combinations of the aforementioned three kinds, and the distance from the sample data M to be concealed is short but the correlation of data is close. As a result, such an interpolation value by the combination (c) and (d) on the common line as can give a highly accurate interpolation value is preferentially outputted to the data selector 10. Moreover, the data selector 10 accomplishes the concealing operation by switching between the sample data M from the data read-out circuit 141 and the interpolation value from the concealing data selector 145 by the error flag of the sample data M from the flag read-out circuit 147 and by outputting the sample data M, if no uncorrectable error, and the interpolation value, if any, to the data output terminal.

Figure 15:
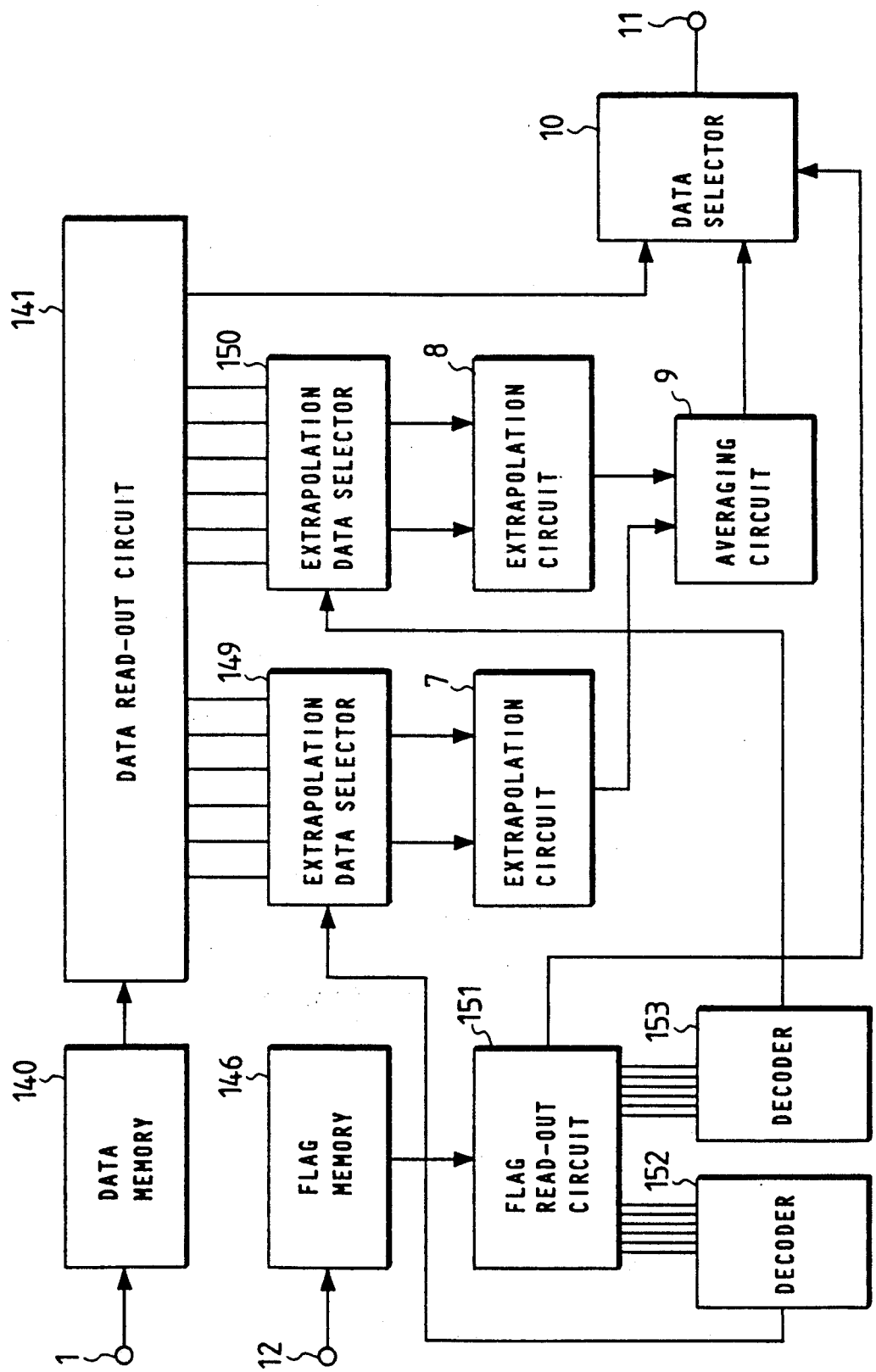

FIG. 15 is a block diagram showing one embodiment of the method of switching the interpolation methods of nine kinds. In FIG. 15: reference numerals 149 and 150 designate extrapolation data selectors for selecting one of three groups of extrapolation value operating data inputted; numeral 151 designates a flag read-out circuit; and numerals 152 and 153 designate decoders.

The image sample data and error flags inputted from the data input terminal 1 and the flag input terminal of FIG. 15 are temporarily stored in the data memory 140 and the flag memory 140 and the flag memory 146, respectively. The data memory 140 is controlled by the data read-out circuit 141 to have its data read out so that the sample data A, G, N, O, Q and U may be outputted lation values of the combinations of (a), (d) and (e) of the sample data A, G, N, 0, Q and U may be outputted to the extrapolation data selector 149 whereas the sample data necessary for determining the extrapolation values of the combinations of (b), (c) and (f) of the sample data E, I, K, L, S and Y may be outputted to the extrapolation data selector 150, when the sample data M of FIG. 7 is outputted to the data selector 10.

On the other hand, the flag read-out circuit 151 reads out the error flags suitably from the flag memory 146 so that the data read-out circuit 141 can output the error flag of the sample data M to the control terminal of the data selector 10, the error flags of the sample data A, G, N, O, Q and U to the decoder 152, and the error flags of the sample data E, I, K, L, S and Y to the decoder 153 in accordance with the timing for outputting the sample data M. The decoders 152 and 153 check the error flags of the aforementioned individual sample data so that the decoder 152 outputs a selection signal for selecting the correct one of the combinations of (a), (d) and (e) of FIG. 1 to the control terminal of the extrapolation data selector 141 whereas the decoder 153 outputs a selection signal for selecting the correct one of the combinations of (b), (c) and (f) to the control terminal of the extrapolation data selector 150. The decoders 152 and 153 can naturally be constructed such that the combinations of the data on the common line, i.e., the combinations of (c) and (e) may be preferentially selected as in the case of the embodiment of FIG. 14.

The extrapolation data selectors 149 and 150 output that one of the three groups of the extrapolation operation data, which has not uncorrectable error, to the extrapolation circuits 7 and 8 in response to the selection signals coming from the decoders 152 and 153. Of course, the extrapolation data selectors 149 and 150 and the extrapolation circuits 7 and 8 are so connected that the sample data G, I, L, N, Q and S of FIG. 7, for example, are inputted to the adjacent data input terminal whereas the sample data A, E, K, O, U and Y are inputted to the next adjacent data input terminal.

In the following, the outputs of the extrapolation circuits are inputted to the averaging circuit 9 so that the interpolation value of one of nine kinds of the combinations of (c) and (d), (a) and (f), (b) and (e), (a) and (b), (a) and (c), (b) and (e), (c) and (e), (e) and (f), and (e) and (f) is outputted from the averaging circuit 9 to the data selector 10 in accordance with the occurrence situation of the error. Moreover, the data selector 10 is controlled by the error flag of the sample data M from the flag read-out circuit 151 to accomplish the highly accurate error concealing by switching between the sample data M from the data read-out circuit 141 and the interpolation value from the averaging circuit 9 to output the interpolation value, if the sample data M has the uncorrectable error, and the sample data M as it is, if not, to the data output terminal 11.

Figure 16:
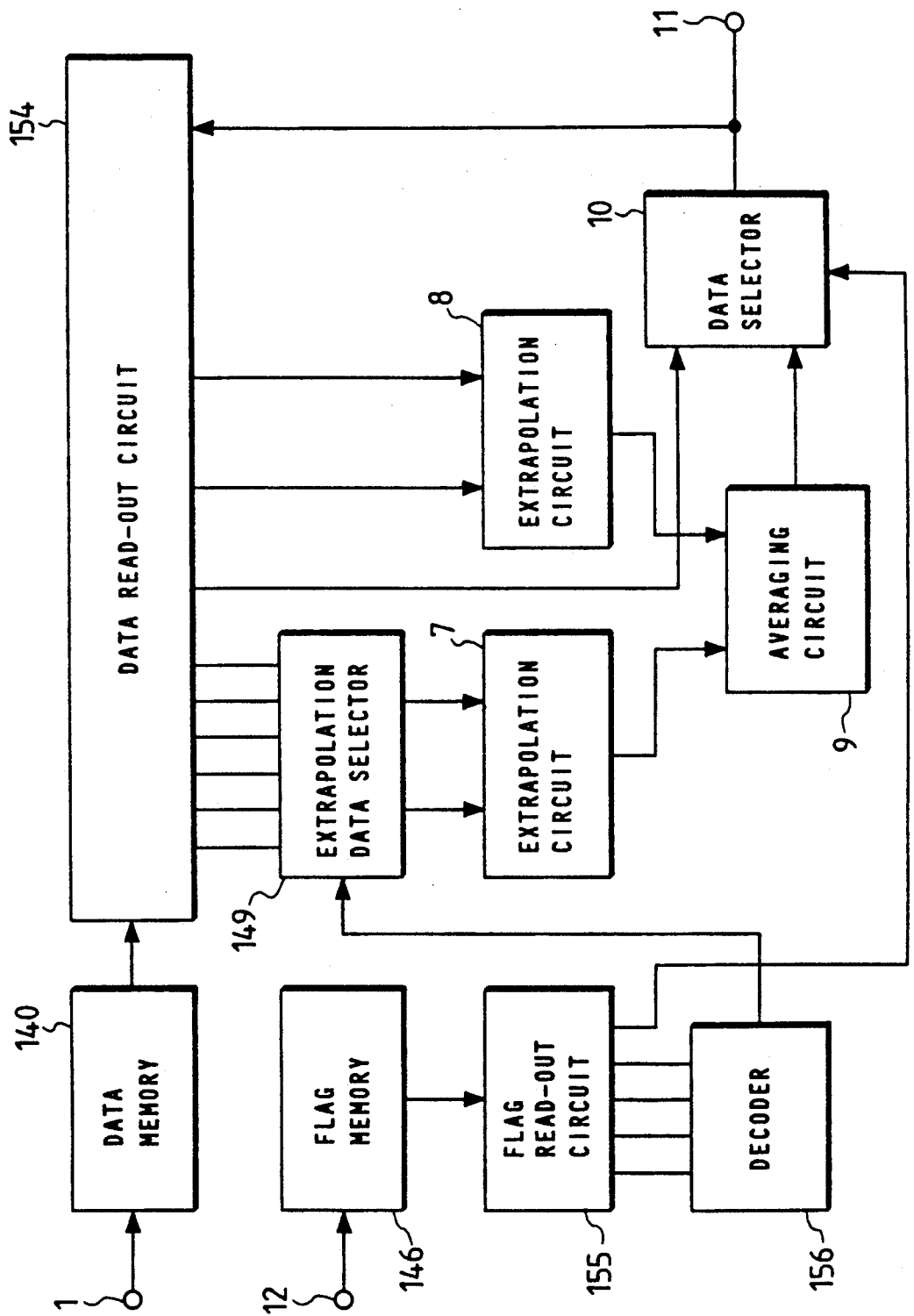

FIG. 16 shows one embodiment of the interpolation circuit which is constructed so as to store the concealed data again in a data memory, to fix the extrapolation value using the concealed data preceding the sample data M, i.e., any of the groups of (a), (b) and (c) of FIG. 7, even if the uncorrectable error is present, and to select another group of extrapolation values to be combined with the foregoing group in accordance with the error occurrence situation. In the present embodiment, the extrapolation value to be fixed is one by the combination (c), and another group of extrapolation values is switched to any of (a), (d) and (e).

In FIG. 16: reference numeral 154 designates a data memory control circuit; numeral 155 designates a flag read-out circuit; and numeral 156 designates a decoder.

The image sample data and the error flags inputted from the data input terminal 1 and the flag input terminal 12 of FIG. 16 are temporarily stored in the data memory 140 and the flag memory 146, respectively. The data memory 140 is controlled by the data memory control circuit 154 to have its data suitably read out such that the sample data necessary for determining the extrapolation values of the combinations (a), (d) and (e) of the sample data A, G, N, O, Q and U are outputted to the extrapolation data selector 149 whereas the sample data K and L are outputted to the next adjacent and adjacent data input terminals of the extrapolation circuit 8, respectively, when the sample data M of FIG. 7 is outputted to the data selector 10.

On the other hand, the flag read-out circuit 155 reads out the error flags suitably from the flag memory 146 so that the error flag of the sample data M may be outputted to the control terminal of the data selector 10 whereas the error flags of the sample data N, 0, Q and U succeeding the sample data M may be outputted to the decoder 156 by the data memory control circuit 154 in accordance with the timing for outputting the sample data M. The decoder 156 checks the error flag inputted to output the selection signal to the control terminal of the extrapolation data selector 149 thereby to select the combination (d), if the sample data N and O have nor error, the combination (e) if at least one of the sample data N and 0 has the error and if the sample data Q and U have no error, and the combination (a) of the sample data A and G, which has been at least concealed and written in the data memory 140, if at least either of the sample data Q and U has the error.

In response to the selection signal from the decoder 156, the extrapolation data selector 149 outputs one of the combinations of (d), (e) and (a) of the sample data N, O, Q, U, A and G to the extrapolation circuit 7. The extrapolation data selector 149 and the extrapolation circuit 7 are so connected that the sample data G, N, and Q may be inputted to the adjacent data input terminal whereas the sample data A, O and Y may be inputted to the next adjacent data input terminal.

In the following, the outputs of the extrapolation circuits 7 and 8 are inputted to the averaging circuit 9 so that the concealed value of one of the combinations of (a) and (c), (c) and (d), and (c) and (e) is outputted from the averaging circuit 9 to the data selector 10 in accordance with the error occurrence situation. Moreover, the data selector 10 is controlled by the error flag of the sample data M from the flag read-out circuit 155 to switch between the sample data A from the data memory control circuit 154 and the interpolation value from the averaging circuit 9 thereby to output the interpolation value to the data output terminal 11, if the sample data M has the uncorrectable error, and otherwise outputs the sample data M as it is to the data output terminal 11 and returns the same to the data memory control circuit 154. This data memory control circuit 154 rewrites the concealed data of the sample data M in the data memory 140 for the subsequent concealing operations of the sample data.

The present invention has been detailed hereinbefore by taking the NTSC composite video signals as an example. The method of the embodiment of FIG. 1 and the method for the interpolations by the combination of the sample data of FIG. 8 using the adjacent and next adjacent data on the same line can naturally be effectively used when used for concealing the errors of the video signals of the PAL system or the audio signals.

We claim:

1. An interpolation circuit comprising:
    a data source for generating successive data in time series;
    first to fifth holding means for holding five successive data generated successively in time series, respectively;
    first estimation circuit for estimating a first extrapolated data for the data held in said third holding means by extrapolation of the data held in said first and second holding means;
    second estimation circuit for estimating a second extrapolated data for the data held in said third holding means by extrapolation the data held in said fourth and fifth holding means;
    operation means for operating said first and second extrapolated data from said first and second estimation circuits to estimate data in said third holding means;
    determination means for determining the correctness of the data held in said third holding means; and
    selection means for selecting the data held in said third holding means, if the data held in the third holding means is correct, and the operated result from said operation means in place of said data if the data held in the third means is erroneous.

2. An interpolation circuit according to claim 1, wherein each of said first and second estimation circuits includes an extrapolation circuit for generating an estimation data by an extrapolation on the basis of the two data inputted.

3. An interpolation circuit according to claim 1, wherein said operation means calculates the average value of said two estimated data.

4. An interpolation circuit according to claim 1, wherein said data are the picture element sample data of a video signal, and wherein two sample data preceding and those succeeding an erroneous sample data are located on any of the horizontal, vertical and diagonal lines passing through the erroneous sample data position on the display screen of the video signal.

5. An interpolation circuit according to claim 1, wherein said first to fifth holding means include serially connected first to fifth data registers, the first of which has its input terminal connected with said data source, the first and second of which have their output terminals connected with said first estimation circuit, and the fourth and fifth of which have their output terminals connected with said second estimation circuit.

6. An interpolation circuit according to claim 5, wherein said data source generates simultaneously said data and error data indicating the correctness of said data, and wherein said determination means includes serially connected first, second and third latches for latching said error data sequentially so that the data transfer among said first to third latches is accomplished simultaneously with the data transfer among said first to third data register.

* * * * *